(12) United States Patent
Lee et al.

(10) Patent No.: US 12,353,074 B2
(45) Date of Patent: Jul. 8, 2025

(54) DISPLAY APPARATUS HAVING A VIEWING ANGLE CONTROL UNIT

(71) Applicant: LG Display Co., Ltd., Seoul (KR)

(72) Inventors: Seung Joon Lee, Paju-si (KR); Seok Hwan Oh, Paju-si (KR); Yong Kun Kim, Paju-si (KR); Seong Yeop Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 102 days.

(21) Appl. No.: 18/366,595

(22) Filed: Aug. 7, 2023

(65) Prior Publication Data
US 2024/0219757 A1 Jul. 4, 2024

(30) Foreign Application Priority Data

Dec. 28, 2022 (KR) ........................ 10-2022-0187725
Jul. 27, 2023 (KR) ........................ 10-2023-0098372

(51) Int. Cl.
*G02F 1/13* (2006.01)
*B60K 35/00* (2024.01)
*B60K 35/22* (2024.01)
*F21V 8/00* (2006.01)

(52) U.S. Cl.
CPC ......... *G02F 1/1323* (2013.01); *G02B 6/0076* (2013.01); *B60K 35/00* (2013.01); *B60K 35/22* (2024.01); *B60K 2360/349* (2024.01)

(58) Field of Classification Search
CPC ...... G02F 1/1323; G02B 6/0076; B60K 35/22
See application file for complete search history.

(56) References Cited

U.S. PATENT DOCUMENTS

| 6,359,369 | B1 | 3/2002 | Iino et al. |
| 7,609,339 | B2 | 10/2009 | Choi |
| 10,036,846 | B2 | 7/2018 | Lee et al. |

(Continued)

FOREIGN PATENT DOCUMENTS

| CN | 108983447 A | 12/2018 |
| JP | 3226894 B2 | 11/2001 |

(Continued)

OTHER PUBLICATIONS

Taiwan Intellectual Property Office, Office Action, Taiwanese Patent Application No. 112138126, Oct. 23, 2024, 11 pages.

(Continued)

*Primary Examiner* — Lucy P Chien
(74) *Attorney, Agent, or Firm* — Fenwick & West LLP

(57) ABSTRACT

A display apparatus includes a first light-source element and a first light-guide plate on the substrate. The display apparatus includes a second light-source element and a second light-guide plate. The second light-source element may be configured to be turned on or off depending on a narrow viewing mode or a wide viewing mode. A display panel on the second light-guide plate may be configured to receive light and generate an image, the display panel including a first display area and a second display area. The display apparatus includes a viewing angle control unit between the first light-guide plate and the second light-guide plate. A first area of the viewing angle control unit may overlap the first display area of the display panel, and the viewing angle control unit may include at least one or more light-blocking patterns extending in a first direction in the first area.

19 Claims, 9 Drawing Sheets

(56) References Cited

U.S. PATENT DOCUMENTS

| | | |
|---|---|---|
| 11,796,843 B2 | 10/2023 | Chen et al. |
| 2008/0002110 A1 | 1/2008 | Choi |
| 2017/0153383 A1 | 6/2017 | Lee et al. |
| 2021/0055582 A1 | 2/2021 | Chen et al. |
| 2022/0206342 A1 | 6/2022 | Shin |

FOREIGN PATENT DOCUMENTS

| | | |
|---|---|---|
| JP | 2010-223996 A | 10/2010 |
| JP | 2017-098246 A | 6/2017 |
| KR | 10-2008-0001522 A | 1/2008 |
| TW | I768353 B | 6/2022 |

OTHER PUBLICATIONS

European Patent Office, Extended European Search Report, European Patent Application No. 23191680.0, Jan. 23, 2024, eight pages.
Japan Patent Office, Office Action, Japanese Patent Application No. 2023-182344, Dec. 24, 2024, eight pages.

DISPLAY APPARATUS HAVING A VIEWING ANGLE CONTROL UNIT

CROSS-REFERENCE TO RELATED APPLICATIONS

This application claims the benefit of Korean Patent Application Nos. 10-2022-0187725, filed on Dec. 28, 2022, and 10-2023-0098372, filed on Jul. 27, 2023 which are hereby incorporated by reference as if fully set forth herein.

BACKGROUND

Field

The present disclosure relates to a display apparatus including a viewing angle control unit capable of limiting a traveling path of light.

Discussion of the Related Art

Generally, a display apparatus provides an image. For example, the display apparatus may include a liquid crystal panel on a back-light unit. The back-light unit may provide light to the liquid crystal panel. For example, the back-light unit may include at least one light-source device. The liquid crystal panel may realize a specific image using an electric field formed between pixel electrodes and a common electrode. For example, the liquid crystal panel may include a liquid crystal layer between a first display substrate and a second display substrate.

The display apparatus may be installed in various places. For example, the display apparatus may be mounted inside a car. The display apparatus may realize a first image provided to a person sitting in a passenger seat and/or a second image including information necessary for driving. The second image may be realized simultaneously with the first image. For example, in the display apparatus, the liquid crystal panel may include a first display area realizing the first image and a second display area realizing the second image.

The first display area and the second display area may be disposed side by side. For example, the first display area may be located on the passenger seat and the second display area may be located between a driver seat and the passenger seat. Thus, in the display apparatus, eyes of the driver may be dispersed by the first image. That is, in the display apparatus, an accident may occur due to gaze dispersion of people around a user disposed in a specific direction.

SUMMARY

Accordingly, the present disclosure is directed to a display apparatus that substantially obviates one or more problems due to limitations and disadvantages of the related art.

An object of the present disclosure is to provide a display apparatus capable of preventing accidents due to gaze dispersion of people around a user.

Another object of the present disclosure is to provide a display apparatus simultaneously realizing a first image and a second image, in which the first image may be recognized only in a specific direction.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one embodiment, a display apparatus includes a first light-source element configured to provide light to a first optical plate. The display apparatus also includes a second light-source element configured to provide light to a second optical plate. The second light-source element may be configured to be turned on or off depending on a narrow viewing mode or a wide viewing mode. The display apparatus includes a display panel on the second optical plate configured to receive light and generate an image. The display panel including a first display area and a second display area. The display apparatus also includes a viewing angle control unit between the first optical plate and the second optical plate. A first area of the viewing angle control unit may overlap the first display area of the display panel, and the viewing angle control unit may include at least one or more light-blocking patterns extending in a first direction in the first area.

In one embodiment, a display apparatus includes a first light-source element configured to provide light to a first optical plate on the substrate. The display apparatus includes a second light-source element configured to provide light to a second optical plate. The second light-source element may be configured to be turned on or off depending on a narrow viewing mode or a wide viewing mode. The display apparatus also includes a display panel on the second light-guide plate configured to receive light and generate an image. The display panel may include a first display area and a second display area. The display apparatus also includes a viewing angle control unit between the first light-guide plate and the second light-guide plate. A first area of the viewing angle control unit overlaps the first display area of the display panel. The first area of the viewing angle control unit may block at least a portion of light from the first light-source element emitted in a direction different from the first direction from reaching the first display area of the display panel.

BRIEF DESCRIPTION OF THE DRAWINGS

The accompanying drawings, which are included to provide a further understanding of the present disclosure and are incorporated in and constitute a part of this application, illustrate embodiment (s) of the present disclosure and together with the description serve to explain the principle of the present disclosure. In the drawings.

DETAILED DESCRIPTION

Figure 1:
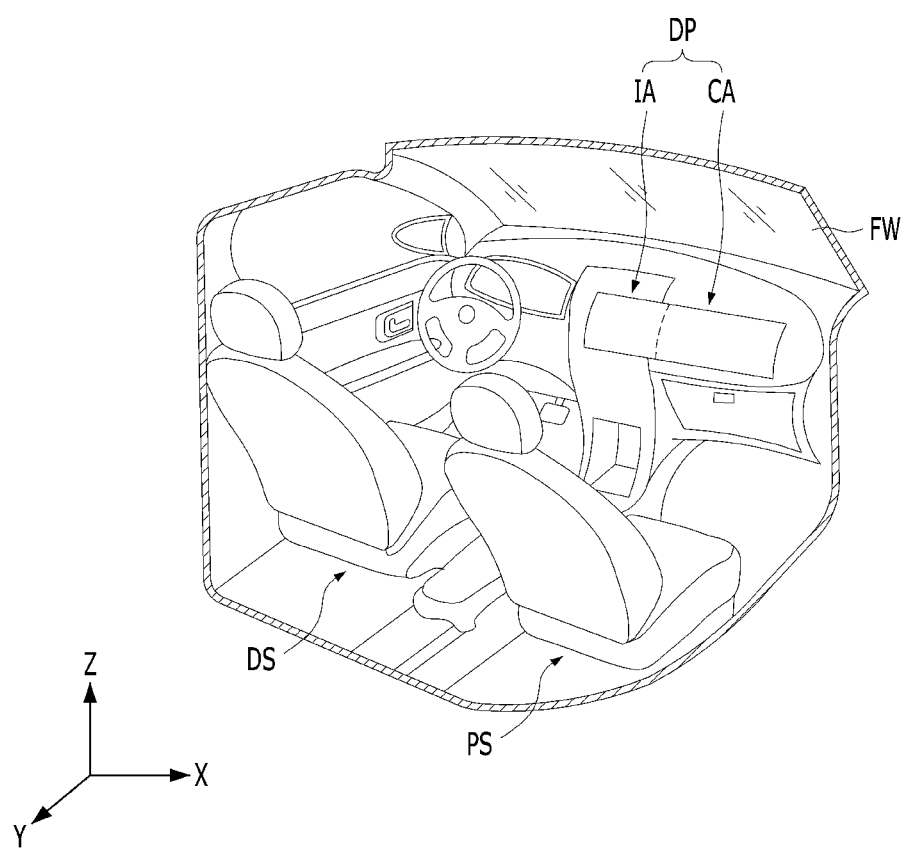
FIG. 1 is a view showing a place in which a display apparatus according to an embodiment of the present disclosure is installed.

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical sprit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the first element and the second element may be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

And, unless 'directly' is used, the terms "connected" and "coupled" may include that two components are "connected" or "coupled" through one or more other components located between the two components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiment

Figure 2:
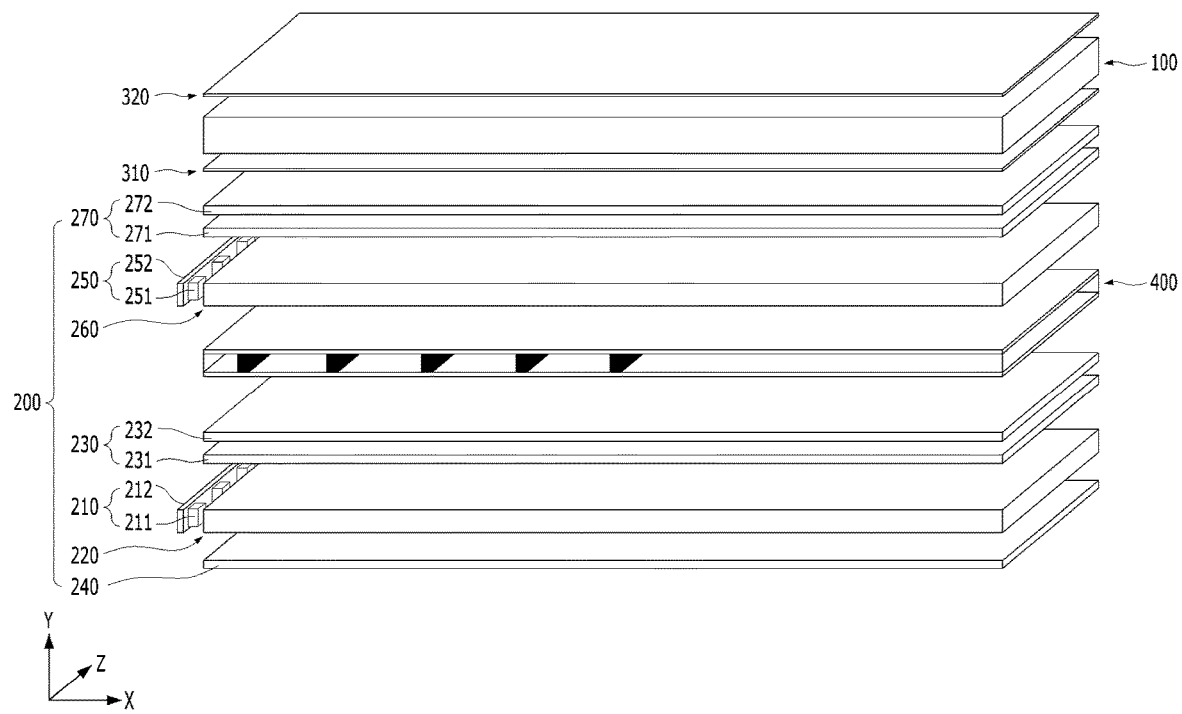
FIG. 2 is a view schematically showing the display apparatus according to the embodiment of the present disclosure.
Figure 3:
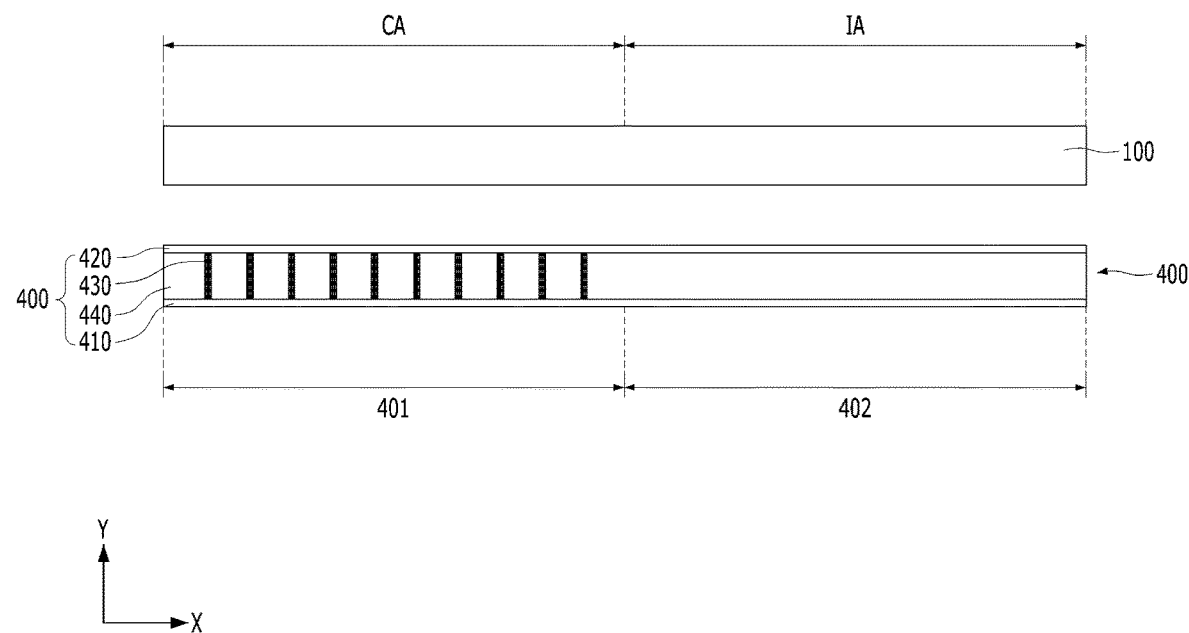
FIG. 3 is a view showing a cross-section of a liquid crystal panel and a cross-section of a viewing angle control unit in the display apparatus according to the embodiment of the present disclosure.

FIG. 1 is a view showing a place in which a display apparatus according to an embodiment of the present disclosure is installed. FIG. 2 is a view schematically showing the display apparatus according to the embodiment of the present disclosure. FIG. 3 is a view showing a cross-section of a liquid crystal panel and a cross-section of a viewing angle control unit in the display apparatus according to the embodiment of the present disclosure.

Referring to FIGS. 1 to 3, the display apparatus DP according to the embodiment of the present disclosure may installed in a car. The display apparatus DP may include a liquid crystal panel 100. The liquid crystal panel 100 may realize an image using an electric field formed between pixel electrodes and a common electrode. For example, the liquid crystal panel 100 may include a liquid crystal layer between a first display substrate and a second display substrate. The liquid crystal layer may include a liquid crystal in an IPS mode, an ECB mode, or a TN mode.

The display apparatus DP may realize a first image for a person sitting in a passenger seat and/or a second image including information necessary for driving. The second image may be realized simultaneously with the first image. For example, the liquid crystal panel 100 may include a first display area CA and a second display area IA. The first image may be realized in the first display area CA, and the second image may be realized in the second display area IA. The second display area IA may be disposed side by side with the first display area CA in a first direction X. For example, the first display area CA of the liquid crystal panel 100 may be disposed on the passenger seat PS, and the second display area IS of the liquid crystal panel 100 may be disposed between the passenger seat PS and a driver seat DS. A length of the second display area IA in the first direction X may be the same as a length of the first display area CA in the first direction X. The second display area IA may be in direct contact with the first display area CA. For example, a boundary line between the first display area CA and the second display area IA may extend in a third direction Z different from the first direction X.

The liquid crystal panel 100 may be disposed on a back-light unit 200. For example, the liquid crystal panel 100 and the back-light unit 200 may be stacked in a second direction Y perpendicular to the first direction X. The back-light unit 200 may provide light to the liquid crystal panel 100. For example, the liquid crystal panel 100 may realize the first image and the second image using the light provided from the back-light unit 200. A first linear polarizer 310 and a second linear polarizer 320 may be stacked on the back-light unit 200. A transmission axis of the second linear polarizer 320 may be perpendicular to a transmission axis of the first linear polarizer 310. For example, the liquid crystal panel 100 may be disposed between the first linear polarizer 310 and the second linear polarizer 320.

The back-light unit 200 may include a first light-source element 210, a first light-guide plate 220, a second light-source element 250 and a second light-guide plate 260. The first light-source element 210 may emit light to the inside of the first light-guide plate 220. For example, the first light-source element 210 may be disposed on a side of the first light-guide plate 220. The second light-source element 250 may emit light to the inside of the second light-guide plate 260. For example, the second light-source element 250 may be disposed on a side of the second light-guide plate 260. The second light-guide plate 260 may be disposed on an upper surface of the first light-guide plate 220. The upper surface of the first light-guide plate 220 may extend in the first direction X and the third direction Z. The third direction Z may be perpendicular to the first direction X and the second direction Y. For example, the third direction Z may be a direction toward a front window FW of the car in which the display apparatus DP is installed.

The first light-guide plate 220 and the second light-guide plate 260 may function as a surface light source. For example, the second light-guide plate 260 may overlap the first light-guide plate 220. Thus, in the display apparatus according to the embodiment of the present disclosure, the light incident on the first light-guide plate 220 by the first light-source element 210 may be supplied to the liquid crystal panel 100 through the upper surface of the second light-guide plate 260.

The first light-source element 210 may include a plurality of first light-source device 211 and a first circuit board 212. The first light-source devices 211 may be mounted on the first circuit board 212. The second light-source element 250 may include a plurality of second light-source device 251 and a second circuit board 252. The second light-source devices 251 may be mounted on the second circuit board 252.

The second light-source element 250 may be disposed on the first light-source element 210 in the second direction Y. For example, the first light-source element 210 may be disposed on a side of the first light-guide plate 220 toward the first direction X, and the second light-source electrode 250 may be disposed on a side of the second light-guide plate 260 toward the first direction X. The first light-source element 210 and the second light-source element 250 may be controlled, independently. For example, the second circuit board 252 may be spaced apart from the first circuit board 212. The second light-source devices 251 may be disposed side by side with the first light-source devices 211 in the second direction Y.

The first light-source devices 211 may be disposed side by side along a side of the first light-guide plate 220. The second light-source devices 251 may be disposed side by side along a side of the second light-guide plate 260. For example, the first display area CA of the liquid crystal panel 100 may be disposed close to the first light-source devices 211 and the second light-source devices 251.

The back-light unit 200 may further includes a reflection plate 240 disposed on a lower surface of the first light-guide plate 220. For example, the first light-guide plate 220 may be disposed between the reflection plate 240 and the second light-guide plate 250. The reflection plate 240 may include a material having high reflectance. For example, the reflection plate 240 may include a metal, such as aluminum (Al) or silver (Ag). Thus, in the display apparatus according to the embodiment of the present disclosure, the light emitted from the lower surface of the first light-guide plate 220 may be reflected in a direction toward the upper surface of the first light-guide plate 220 by the reflection plate 240. Therefore, in the display apparatus according to the embodiment of the present disclosure, light efficiency may be improved.

The back-light unit 200 may include a plurality of optical sheets 230 and 270. The light emitted through the upper surface of the first light-guide plate 220 and the light emitted through the upper surface of the second light-guide plate 260 may have uniform properties by the optical sheets 230 and 270. For example, the optical sheets 230 and 270 may include a first optical sheet 230 between the first light-guide plate 220 and the second light-guide plate 260 and a second optical sheet 270 between the second light-guide plate 260 and the first linear polarizer 310.

The properties of the light emitted through the upper surface of the first light-guide plate 220 may be uniform as a whole by the first optical sheet 230. For example, the first optical sheet 230 may have a stacked structure of a first diffusion sheet 231 and a first prism sheet 232. The properties of the light emitted through the upper surface of the second light-guide plate 260 may be uniform as a whole by the second optical sheet 270. The second optical sheet 270 may have a stacked structure same as the first optical sheet 230. For example, the second optical sheet 270 may have a stacked structure of a second diffusion sheet 271 and a second prism sheet 272.

A viewing angle control unit 400 may be disposed between the first light-guide plate 220 and the second light-guide plate 260 of the back-light unit 200. For example, the viewing angle control unit 400 may be disposed between the first optical sheet 230 and the second light-guide plate 260. The viewing angle control unit 400 may partially limit the traveling direction of the light passing through the first optical sheet 230. For example, the viewing angle control unit 300 may include a narrow viewing angle area 410 in which light-blocking patterns 430 are disposed, and a wide viewing angle area 402 disposed outside the light-blocking patterns 430.

The light-blocking pattern 430 may include a material capable of blocking light. For example, the light-blocking patterns 430 may include a black dye, such as carbon black. The light-blocking patterns 430 may extend parallel in a direction. That is, in the display apparatus according to the embodiment of the present disclosure, the travelling path of the light passing through the narrow viewing angle area 401 of the viewing angle control unit 400 may be limited by the light-blocking patterns 430. In one embodiment, the light-blocking patterns 430 allow the viewing angle control unit 400 to prevent or block at least a portion of light emitted from the first light-source element 210 from being provided to the first display area CA of the liquid crystal panel 100. For example, each of the light-blocking patterns 430 may extend in the third direction Z between a first control substrate 410 and a second control substrate 420. Each of the light-blocking patterns 430 may also extend in the second direction Y with a thickness. Thus, in the display apparatus according to the embodiment of the present disclosure, the viewing angle in the first direction X may be limited by the viewing angle area 401 of the viewing angle control unit 400. Therefore, in the display apparatus according to the embodiment of the present disclosure, an image realized by the light passing through the narrow viewing angle area 401 of the viewing angle control unit 400 may be not recognized by people adjacent in the first direction X. For example, in the display apparatus according to the embodiment of the present disclosure, an image realized by the light passing through the narrow viewing angle area 401 may be not recognized by the driver.

The narrow viewing angle 401 of the viewing angle control unit 400 may overlap the first display area CA of the liquid crystal panel 100. For example, in the display apparatus according to the embodiment of the present disclosure, the first image provided by the first display area CA of the liquid crystal panel 100 may be the image realized by the light passing through the narrow viewing angle area 401 of the viewing angle control unit 400. Thus, in the display apparatus according to the embodiment of the present disclosure, the image that is not recognized by the driver sitting in the driver seat DS may be realized in the first display area CA of the liquid crystal panel 100. Therefore, in the display apparatus according to the embodiment of the present disclosure, gaze dispersion of the driver may be prevented.

The light-blocking pattern 430 may be surrounded by a pattern insulating layer 440. For example, the pattern insulating 440 may be disposed between the first control substrate 410 and the second control substrate 420, and each of the light-blocking patterns 430 may cross the pattern insulating layer 440 in the third direction Z. Thus, in the display apparatus according to the embodiment of the present disclosure, the light passing through the upper surface of the first light-guide plate 220 may be incident on the second light-guide plate 260 by passing through the pattern insulating layer 440 of the viewing angle control unit 400. The pattern insulating layer 440 may include an insulating material. The pattern insulating layer 440 may include a transparent material. The refractive index of the pattern insulating layer 440 may be substantially the same as the refractive index of the first control substrate 410 and the refractive index of the second control substrate 420. Therefore, in the display apparatus according to the embodiment of the present disclosure, the loss of light due to the difference in refractive index between the first control substrate 410 and the pattern insulating layer 440 and the difference in refractive index between the pattern insulating layer 440 and the second control substrate 420 may be reduced or minimized.

A thickness of the pattern insulating layer 440 may be the same as a thickness of each light-blocking pattern 430. For example, the second control substrate 420 may be disposed parallel to the first control substrate 410. A space between the first control substrate 410 and the second control substrate 420 in the narrow viewing angle area 401 may be completely filled by the light-blocking patterns 430 and the pattern insulating layer 440. Thus, in the display apparatus according to the embodiment of the present disclosure, deform of the viewing angle control unit 400 due to external impact may be prevented. And, in the display apparatus according to the embodiment of the present disclosure, distortion of the image due to the light passing through the viewing angle control unit 400 may be prevented.

Only the first control substrate 410, the second control substrate 420 and the pattern insulating layer 440 may be disposed in the wide viewing angle area 402 of the viewing angle control unit 400. For example, a space between the first control substrate 310 and the second control substrate 420 in the wide viewing angle area 402 may be completely filled by the pattern insulating layer 440. Thus, in the display apparatus according to the embodiment of the present disclosure, the travelling path of the light passing through the wide viewing angle area 402 of the viewing angle control unit 400 may be not limited. Therefore, in the display apparatus according to the embodiment of the present disclosure, the image realized by the light passing through the wide viewing angle area 402 of the viewing angle control unit 400 may be recognized by surrounding people.

The wide viewing angle area 402 of the viewing angle control unit 400 may overlap the second display area IA of the liquid crystal panel 100. For example, in the display apparatus according to the embodiment of the present disclosure, the second image provided by the second display area IA of the liquid crystal panel 100 may be realized by the light passing through the wide viewing angle area 402 of the viewing angle control unit 400. Thus, in the display apparatus according to the embodiment of the present disclosure, the second image may be recognized by the driver. Therefore, in the display apparatus according to the embodiment of the present disclosure, the second image may be shared with the driver and the person sitting in the passenger seat.

The wide viewing angle area 402 may be disposed side by side with the narrow viewing angle area 401 in the first direction X. A length of the wide viewing angle area 402 in the first direction X may be the same as the length of the narrow viewing angle area 401 in the first direction X. The wide viewing angle area 402 may be in direct contact with the narrow viewing angle area 401. The length of the narrow viewing angle area 401 in the first direction X may be the same as a length of the first display area CA in the first direction. The length of the wide viewing angle area 402 in the first direction X may be the same as a length of the second display area IA in the first direction X. For example, a length of the viewing angle control unit 400 in the first direction X may be the same as a length of the liquid crystal panel 100 in the first direction X. A boundary line between the narrow viewing angle area 401 and the wide viewing angle area 402 may overlap the boundary line between the first display area CA and the second display area IA. For example, the boundary line between the narrow viewing angle area 401 and the wide viewing angle area 402 may extend in the third direction Z.

In the display apparatus according to the embodiment of the present disclosure, the first image realized in the first display area CA of the liquid crystal panel 100 may be partially limited. For example, the display apparatus according to the embodiment of the present disclosure may control whether to share the first image using the second light-source element 250.

Figure 4:
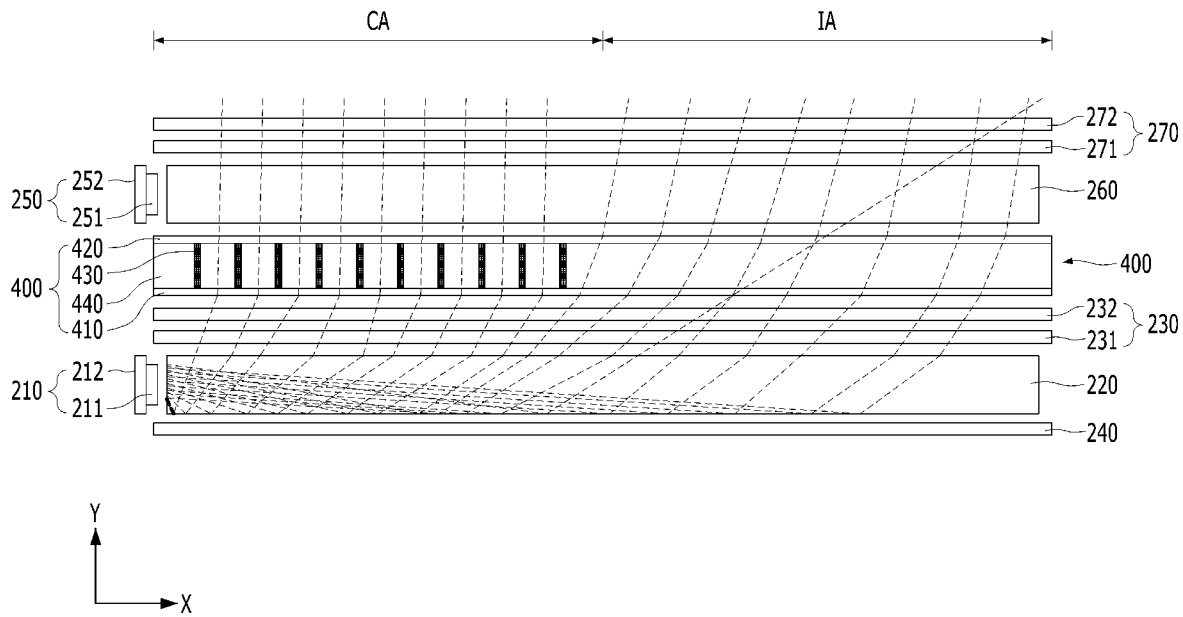
FIGS. 4 and 5 are views showing a travelling direction of light in the back-light unit depending on whether the image realized on a first display area of the liquid crystal panel is shared in the display apparatus according to the embodiment of the present disclosure.
Figure 5:
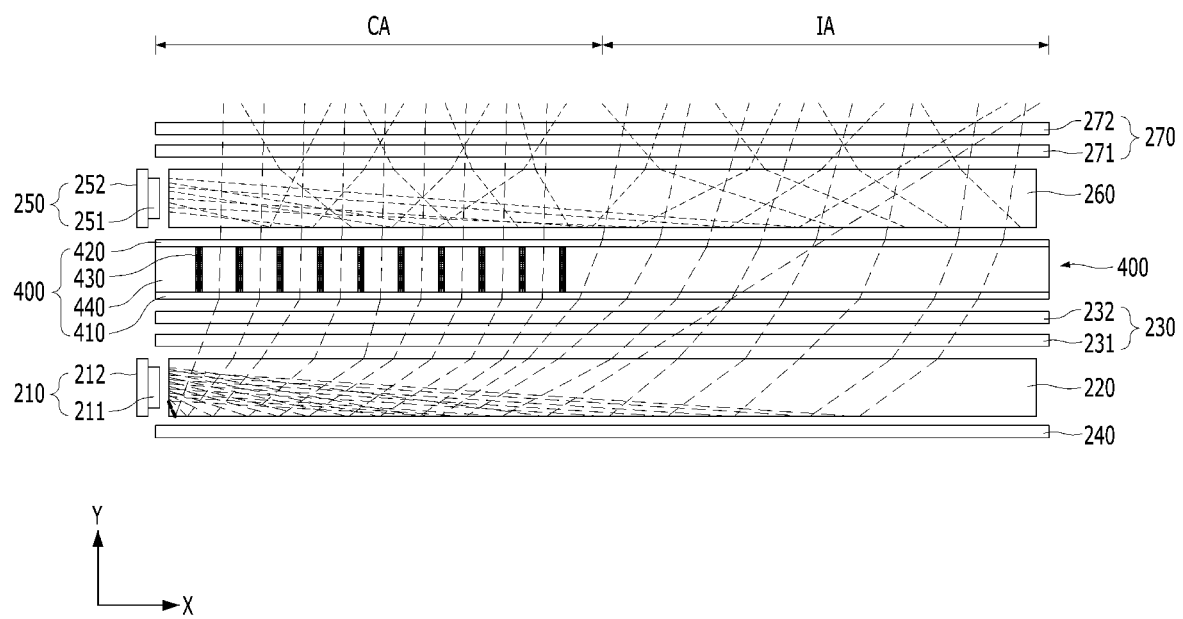

FIG. 4 is a view showing a travelling direction of light in the back-light unit 200, when the viewing angle of the image realized in the first display area CA of the liquid crystal panel 100 is limited in the display apparatus according to the embodiment of the present disclosure. FIG. 5 is a view showing a travelling direction of light in the back-light unit 200, when the viewing angle of the image realized in the first display area CA of the liquid crystal panel 100 is not limited in the display apparatus according to the embodiment of the present disclosure.

In one embodiment, the second light-source element 250 is controlled to be on or off depending on whether the display apparatus is in a narrow viewing mode or a wide viewing mode. Referring to FIGS. 1 to 4, only the light passing through the narrow viewing angle area 401 of the viewing angle control unit 400 may be provided to the first display area CA of the liquid crystal panel 100, and only the light passing through the wide viewing angle area 402 of the viewing angle control unit 400 may be provided to the second display area IA of the liquid crystal panel 100, when the second light-source element 250 is not operated (e.g., narrow viewing mode) in the display apparatus according to the embodiment of the present disclosure. Thus, in the display apparatus according to the embodiment of the present disclosure, the first image realized in the first display area CA of the liquid crystal panel 100 may be not recognized by the driver, and the second image realized in the second display area IA of the liquid crystal panel 100 may be shared with the driver and the person sitting in the passenger seat. In other words, the first display area CA of the liquid crystal panel 100 may be configured to receive light from the first light-source element 210 provided through the first light-guide plate 220 that passes through the spaces between the light-blocking patterns 430 to emit images.

And, referring to FIGS. 1 to 3 and 5, the light passing through the narrow viewing angle area 401 of the viewing angle control unit 400 and the light provided to the second light-guide plate 260 by the second light-source element 250 may be provided to the first display area CA of the liquid crystal panel 100, and the light passing through the wide viewing angle area 402 of the viewing angle control unit 400 and the light provided to the second light-guide plate 260 by the second light-source element 250 may be provided to the second display area IA of the liquid crystal panel 100, when the second light-source element 250 is operated in the display apparatus according to the embodiment of the present disclosure. That is, in the display apparatus according to the embodiment of the present disclosure, the light that is not pass through the narrow viewing angle area 401 of the viewing angle control unit 400 may be provided to the first display area CA of the liquid crystal panel 100, when the second light-source element 250 is operated (e.g., wide viewing mode). Therefore, in the display apparatus according to the embodiment of the present disclosure, both the first image realized in the first display area CA and the second image realized in the second display area IA may be recognized to the driver and the person sitting in the passenger seat. For example, in the display apparatus according to the embodiment of the present disclosure, a single large image shared by the driver and the person sitting in the passenger seat may be realized in the first display area CA and the second display area IA of the liquid crystal panel 100, when the second light-source element 250 is operated. In other words, the liquid crystal panel 100 may be configured to receive light from the first light-source element 210 passing through the spaces between the light-blocking patterns 430 as well as the light from the second light-source element 250 provided via the second light-guide plate 260 to emit the images.

Accordingly, the display apparatus according to the embodiment of the present disclosure may include the viewing angle control unit 400 between the first light-guide plate 220 and the second light-guide plate 260 of the back-light unit 200 and the liquid crystal panel 100 on the second light-guide plate 260 of the back-light unit 200, wherein the liquid crystal panel 100 may include the first display area CA and the second display area IA, which are disposed side by side in the first direction X, wherein the viewing angle control unit 400 may include the narrow viewing angle area 401 in which the light-blocking patterns 430 are disposed, and the wide viewing angle area 402 disposed outside the light-blocking patterns 430, wherein the narrow viewing angle area 401 of the viewing angle control unit 400 may overlap the first display area CA of the liquid crystal panel 100, and wherein the wide viewing angle area 402 of the viewing angle control unit 400 may overlap the second display area IA of the liquid crystal panel 100. Thus, in the display apparatus according to the embodiment of the present disclosure, the first image realized in the first display area CA of the liquid crystal panel 100 may be not recognized by the driver according to the operation of the second light-source element 250 providing the light to the second light-guide plate 260, selectively. That is, in the display apparatus according to the embodiment of the present disclosure, the viewing angle of the first image realized in the first display area CA of the liquid crystal panel 100 may be selectively limited. Therefore, in the display apparatus according to the embodiment of the present disclosure, gaze of surrounding people due to the first image realized in the first display area CA of the liquid crystal panel 100 may be selectively blocked. For example, in the display apparatus according to the embodiment of the present disclosure, accidents due to gaze dispersion of the driver may be prevented.

The display apparatus according to the embodiment of the present disclosure is described that the length of the second display area IA in the first direction X is the same as the length of the first display area CA in the first direction X. However, in the display apparatus according to another embodiment of the present disclosure, the length of the second display area IA in the first direction X may be different from the length of the first display area CA in the first direction X. For example, in the display apparatus according to another embodiment of the present disclosure, the length of the second display area IA in the first direction X may be smaller than the length of the first display area CA in the first direction X.

It is described that the display apparatus according to the embodiment of the present disclosure is installed in the car. However, the display apparatus according to another embodiment of the present disclosure may be installed in various places. For example, the display apparatus according to another embodiment of the present disclosure may be installed in a billboards or the like to provide large images to people around it. In the display apparatus according to another embodiment of the present disclosure, the first display area CA having a size smaller than the second display area IA may function as a monitor for modifying and changing a realized image. Thus, in the display apparatus according to another embodiment of the present disclosure, the image shared with people around it may be modified and changed without adding a display panel.

Figure 6:
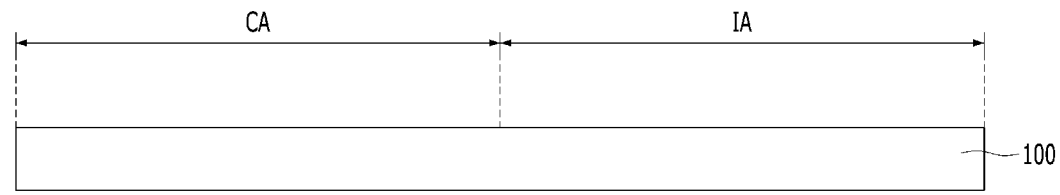
FIGS. 6 to 17 are views showing display apparatus according to other embodiments of the present disclosure.
Figure 6:
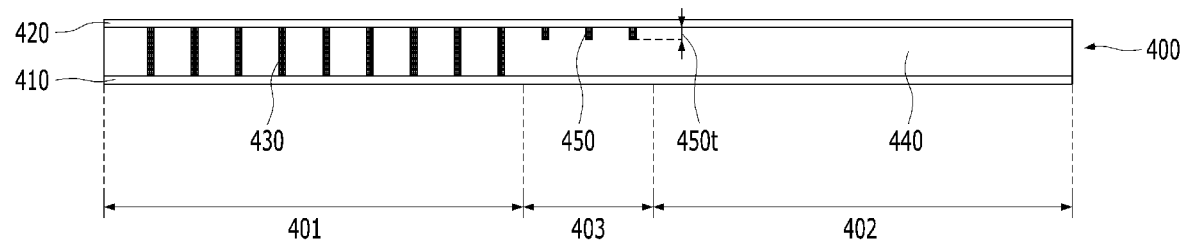
Figure 6:
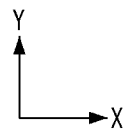

In display according to the apparatus embodiment of the present disclosure, a luminance deviation between the first image realized in the first display area CA of the liquid crystal panel 100 and the second image realized in the second display area IA of the liquid crystal panel 100 due to the light-blocking patterns 430 may be mitigated. For example, in the display apparatus according to another embodiment of the present disclosure, the viewing angle control unit 400 may include a mitigation area 403 between the narrow viewing angle area 401 and the wide viewing angle area 402, as shown in FIG. 6. The mitigation area 403 may be in direct contact with the narrow viewing angle area 401 and the wide viewing angle area 402. The mitigation area 403 of the viewing angle control unit 400 may overlap the boundary line between the first display area CA and the second display area IA. For example, in the display apparatus according to another embodiment of the present disclosure, the length of the narrow viewing angle area 401 may be smaller than the length of the first display area CA in the first direction X, and the length of the wide viewing angle area 402 may be smaller than the length of the second display area IA in the first direction X.

At least one dummy pattern 450 may be disposed in the mitigation area 403 of the viewing angle control unit 400. The dummy pattern 450 may include a material capable of blocking light. For example, the dummy pattern 450 may include a black dye, such as carbon black. The dummy pattern 450 may include a same material as the light-blocking patterns 430.

The dummy pattern 450 may have a thickness smaller than or a length shorter than each light blocking pattern 430. For example, a thickness 450*t* of the dummy pattern 450 may be smaller than a vertical distance between the first control substrate 410 and the second control substrate 420. The dummy pattern 450 may be spaced apart from the first control substrate 410 or the second control substrate 420. For example, the dummy pattern 450 may be in contact with the second control substrate 420, and the first control substrate 410 may be spaced apart from the dummy pattern 450. The dummy pattern 450 may extend in a direction same as the light-blocking patterns 430. For example, the dummy pattern 450 may extend in the third direction Z. Thus, in the display apparatus according to another embodiment of the present disclosure, the viewing angle of light incident on the mitigation area 403 may be limited by the dummy pattern 450. The viewing angle of light passing through the mitigation area 403 may be between the viewing angle of light passing through the narrow viewing angle area 401 and the viewing angle of light passing through the wide viewing angle area 402. That is, in the display apparatus according to another embodiment of the present disclosure, a luminance deviation between the light passing through the narrow viewing angle area 401 and the light passing through the wide viewing angle area 402 may be mitigated by the light passing through the mitigation area 403. Therefore, in the display apparatus according to another embodiment of the present disclosure, the boundary line between the first display area CA and the second display area IA may be not recognized by the user, when the first display area CA and the second display area IA realize a single large image.

A length of the mitigation area 403 in the first direction X may be smaller than the length of the narrow viewing angle area 401 in the first direction X and the length of the wide viewing angle area 402 in the first direction X. Thus, in the display apparatus according to another embodiment of the present disclosure, the first image realized in the first display area CA may be prevented from being recognized by the surrounding people by the mitigation area 403, when the second light-source element 250 is not operate. Therefore, in the display apparatus according to another embodiment of the present disclosure, gaze dispersion due to the mitigation area 403 may be prevented.

Figure 7:
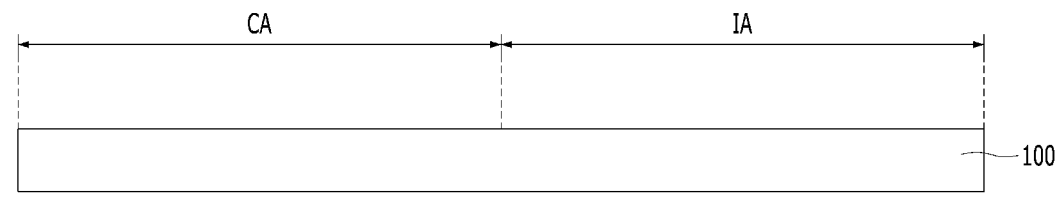
Figure 7:
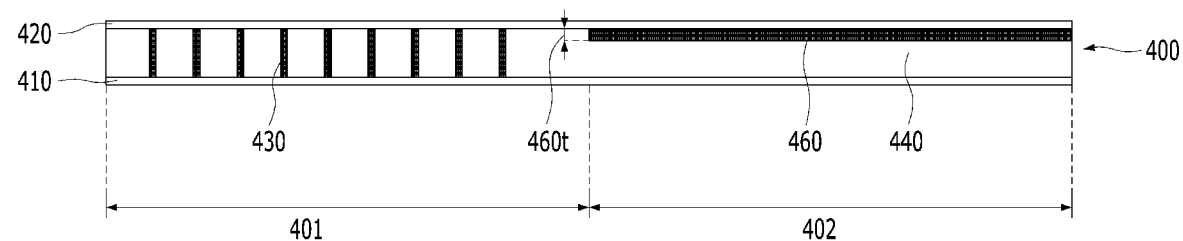
Figure 7:
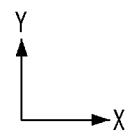

In the display apparatus according to another embodiment of the present disclosure, a dummy light-blocking layer 460 may be disposed in the wide viewing angle area 402 of the viewing angle control unit 400, as shown in FIG. 7. A thickness 460t of the dummy light-blocking layer 460 may be smaller than the thickness of each light-blocking pattern 430. For example, the thickness 460t of the dummy light-blocking layer 460 may be smaller than the vertical distance between the first control substrate 410 and the second control substrate 420. For example, the dummy light-blocking layer 460 may be in contact with the second control substrate 420, and the first control substrate 410 may be spaced apart from the dummy light-blocking layer 460. As another example, the dummy light-blocking layer 460 may be in contact with the first control substrate 410 and spaced apart from the second control substrate 420. The wide viewing angle area 402 of the second control substrate 420 may be completely covered by the dummy light-blocking layer 460. For example, a length of the dummy light-blocking layer 460 in the first direction X may be the same as the length of the wide viewing angle area 402 in the first direction X. The dummy light-blocking layer 460 may extend in a direction same as the light-blocking patterns 430. For example, the dummy light-blocking layer 460 may extend in the third direction Z.

The dummy light-blocking layer 460 may include a material capable of reducing transmitted light. For example, the dummy light-blocking layer 460 may include a black dye, such as carbon black. The dummy light-blocking layer 460 may have a thickness smaller than the light-blocking patterns 430. Light passing through the dummy light-blocking layer 460 may have a brightness substantially same as the light passing through the narrow viewing angle area 401. The dummy light-blocking layer 460 may include a same material as the light-blocking patterns 430. Thus, in the display apparatus according to another embodiment of the present disclosure, the light passing through the wide viewing angle area 402 may have a color substantially same as the light passing through the narrow viewing angle area 401. That is, in the display apparatus according to another embodiment of the present disclosure, a color deviation between the image realized in the first display area CA and the image realized in the second display area IA may be mitigated by the dummy light-blocking layer 460. And, in the display apparatus according to another embodiment of the present disclosure, recognizing of the user for the boundary line between the first display area CA and the second display area IA may be mitigated by the dummy light-blocking layer 460, when a single large image is realized using the first display area CA and the second display area IA. Therefore, in the display apparatus according to another embodiment of the present disclosure, the quality of the image realized by the liquid crystal panel 100 may be improved.

Figure 8:
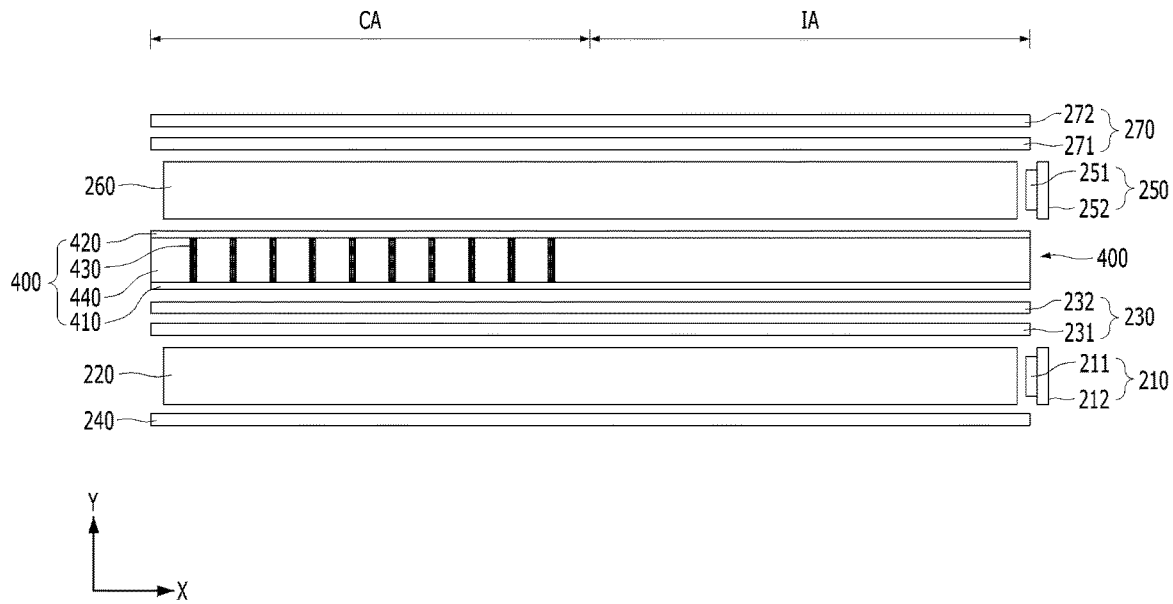

The display apparatus according to the embodiment of the present disclosure is described that the first display area CA of the liquid crystal panel 100 is disposed close to the first light-source element 210 and the second light-source element 250. However, in the display apparatus according to another embodiment of the present disclosure, the first light-source element 210 may be disposed on a side of the first light-guide plate 220 close to the second display area IA of the liquid crystal panel 100, and the second light-source element 250 may be disposed on a side of the second light-guide plate 260 close to the second display area IA of the liquid crystal panel 100, as shown in FIG. 8. Thus, in the display apparatus according to another embodiment of the present disclosure, the degree of freedom for location of the first light-source element 210 and the second light-source element 250 may be improved.

The display apparatus according to the embodiment of the present disclosure is described that the first light-source element 210 is disposed on a side of the first light-guide plate 220, and the second light-source element 250 is disposed on a side of the second light-guide plate 260. However, in display apparatus according to another embodiment of the present disclosure, the first light-source element 210 may be disposed on at least two side of the first light-guide plate 220, and the second light-source element 250 may be disposed on at least two side of the second light-guide plate 260. For example, in the display apparatus according to another embodiment of the present disclosure, the first light-source element 210 may be disposed on a side of the first light-guide plate 220 close to the first display area CA and a side of the first light-guide plate 220 close to the second display area IA, and the second light-source element 250 may be disposed on a side of the second light-guide plate 260 close to the first display area CA and a side of the second light-guide plate 260 close to the second display area IA. Thus, in the display apparatus according to another embodiment of the present disclosure, the amount of the light supplied to the liquid crystal panel 100 may be increased. Therefore, in the display apparatus according to another embodiment of the present disclosure, the luminance of the image realized by the liquid crystal panel 100 may be improved.

The display apparatus according to the embodiment of the present disclosure is described that the second light-source element 250 is disposed side by side with the first light-source element 210 in the second direction Y. However, in the display apparatus according to another embodiment of the present disclosure, the second light-source element 250 may be spaced apart from the first light-source element 210 in the first direction X or the third direction Z. For example, in the display apparatus according to another embodiment of the present disclosure, the first light-source element 210 may be disposed on a side of the first light-guide plate 220 close to the first display area CA, and the second light-source element 250 may be disposed on a side of the second light-guide plate 260 close to the second display area IA. Thus, in the display apparatus according to another embodiment of the present disclosure, the degree of freedom for the relative positions of the first light-source element 210 and the second light-source element 250 may be improved.

Figure 9:
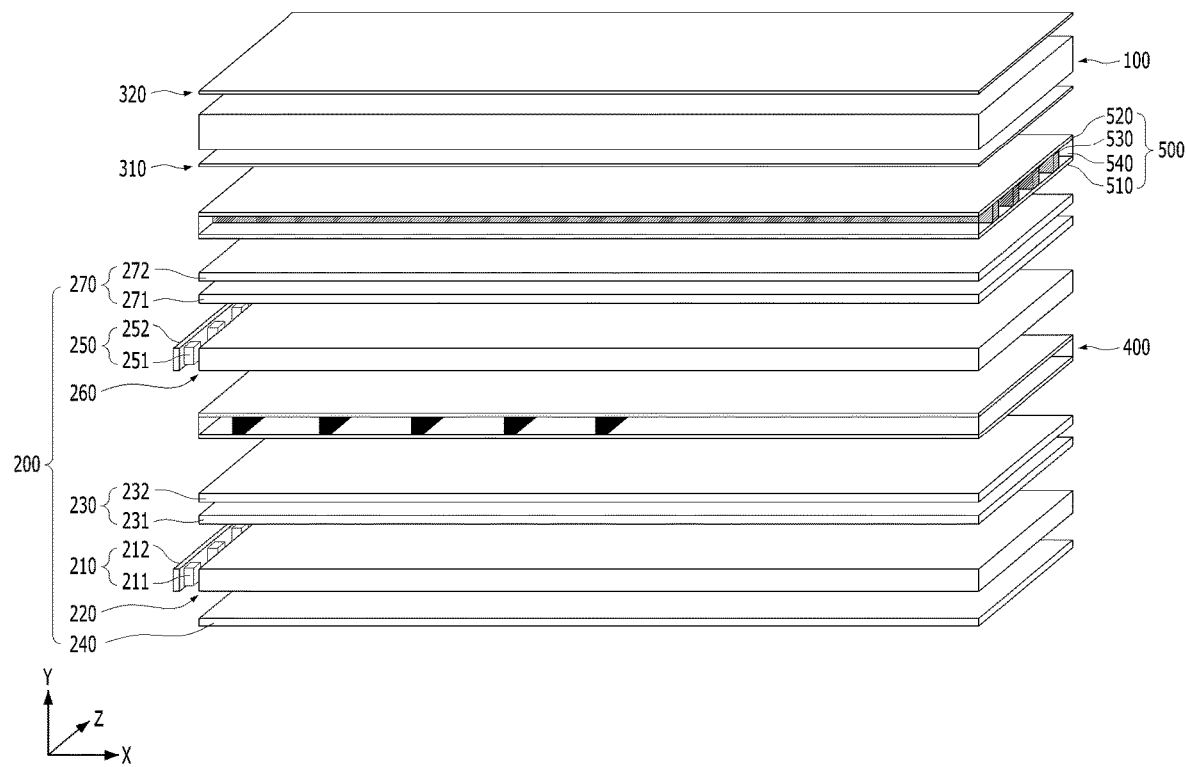

The display apparatus according to the embodiment of the present disclosure is described that a single viewing angle control unit 400 is disposed between the first light-guide plate 220 and the liquid crystal panel 100. However, the display apparatus according to another embodiment of the present disclosure may include a plurality of viewing angle control unit 400. For example, in the display apparatus according to another embodiment of the present disclosure, a first viewing angle control unit 400 may be disposed between the first light-guide plate 220 and the second light-guide plate 260 of the back-light unit 200, and a second viewing angle control unit 500 may be disposed between the second light-guide plate 260 of the back-light unit 200 and the liquid crystal panel 100, as shown in FIG. 9.

The first viewing angle control unit 400 may include a narrow viewing angle area in which first light-blocking patterns extending in the third direction Z are disposed, and a wide viewing angle area disposed outside the first light-blocking patterns. The first light-blocking patterns may be surrounded by a first pattern insulating layer. The first pattern insulating layer may extend between the first control substrate and the second control substrate of the wide viewing angle area. For example, a space between the wide viewing angle area of the first control substrate 410 and the wide viewing angle area of the second control substrate 420 may be completely filled by the first pattern insulating layer 440.

The second viewing angle control unit 500 may include second light-blocking patterns 530 disposed between a third control substrate 510 and a fourth control substrate 520, and a second pattern insulating layer 540 surrounding the second light-blocking patterns 530. The second light-blocking patterns 530 may extend in the first direction X and arranged along the third direction Z. For example, the second light-blocking patterns 530 may extend in a direction perpendicular to the first light-blocking patterns. The second light-blocking patterns 530 may completely cross the liquid crystal panel 100 in the first direction X. For example, the second light-blocking patterns 530 may overlap the first display area and the second display area of the liquid crystal panel 100. Thus, in the display apparatus according to another embodiment of the present disclosure, the viewing angle of the light providing the first display area and the second display area of the liquid crystal panel 100 from the back-light unit 200 may be limited by the second viewing angle control unit 500. That is, in the display apparatus according to another embodiment of the present disclosure, the viewing angle in the third direction Z may be limited by the second viewing angle control unit 500. For example, the display apparatus according to another embodiment of the present disclosure may prevent the image realized by the liquid crystal panel 100 from being reflected by the front window. Therefore, in the display apparatus according to another embodiment of the present disclosure, the accidents due to gaze dispersion of surrounding people may be effectively prevented.

Figure 10:
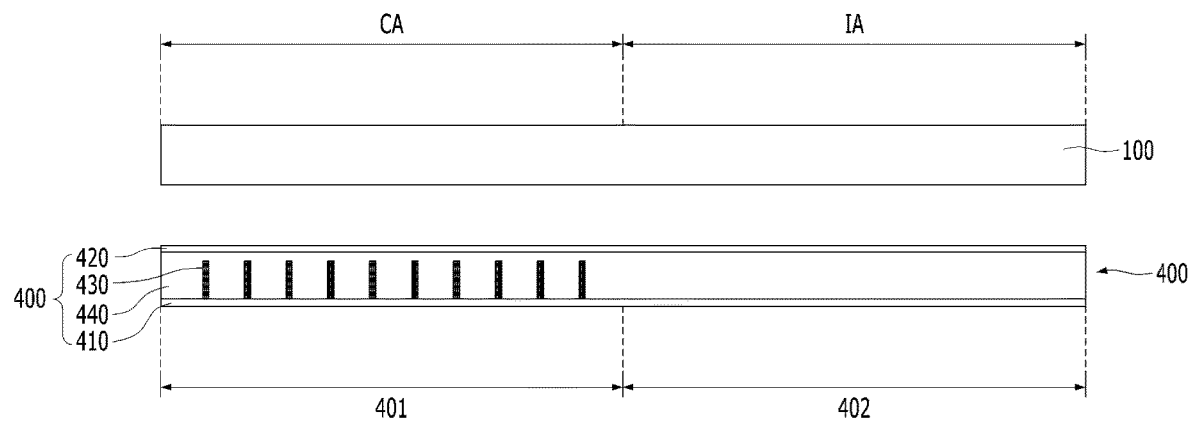

The display apparatus according to the embodiment of the present disclosure is described that a thickness of each light-blocking pattern 430 is the same as a vertical distance between the first control substrate 410 and the second control substrate 420. However, in the display apparatus according to another embodiment of the present disclosure, each of the light-blocking patterns 430 may be spaced apart from the first control substrate 410 or the second control substrate 420. For example, in the display apparatus according to another embodiment of the present disclosure, the first control substrate 410 may contact the light-blocking patterns 430, and the light-blocking patterns 430 may be spaced apart from the second control substrate 420, as shown in FIG. 10. The pattern insulating layer 440 may extend between each light-blocking pattern 430 and the second control substrate 420. The second control substrate 420 may be disposed between the first control substrate 410 and the liquid crystal panel 100. For example, each of the light-blocking patterns 430 in the pattern insulating layer 440 may be disposed close to the light-guide plate of the back-light unit. Thus, in the display apparatus according to another embodiment of the present disclosure, luminance difference between the first image realized in the first display area CA of the liquid crystal panel 100 and the second image realized in the second display area IA of the liquid crystal panel 100 due to the light-blocking pattern 430 may be mitigated. That is, in the display apparatus according to another embodiment of the present disclosure, accidents due to gaze dispersion of the driver may be prevented by using the light-blocking patterns 430, and a boundary line between the first display area CA and the second display area IA may be not recognized by the user.

Figure 11:
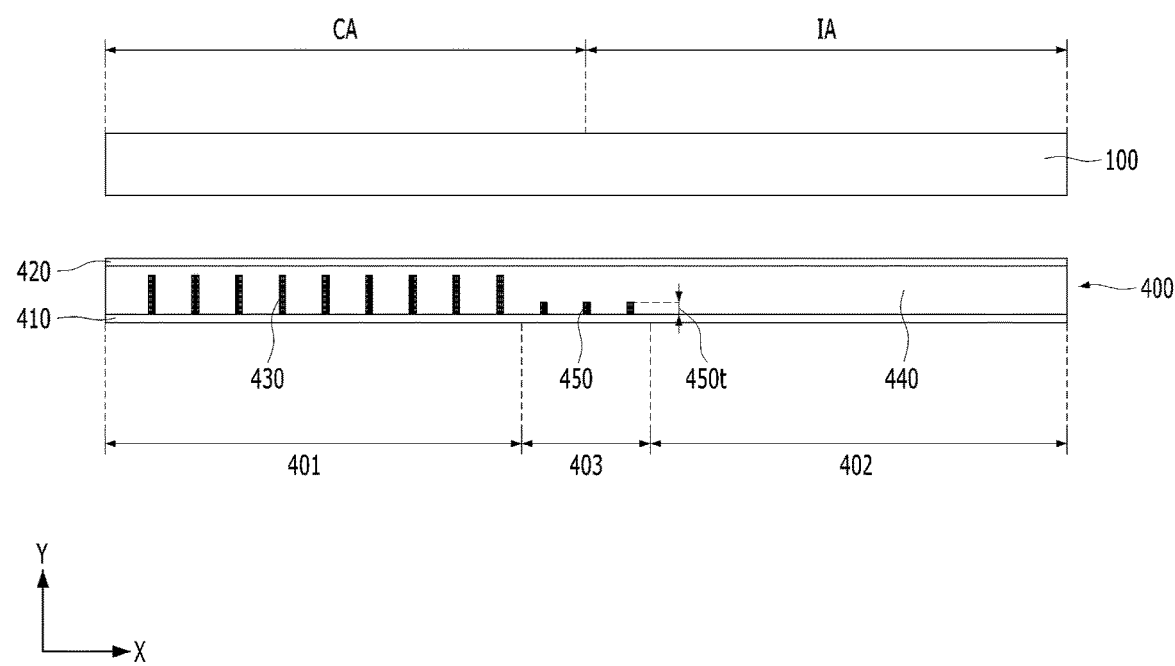

In the display apparatus according to another embodiment of the present disclosure, the dummy pattern 450 of the mitigation area 403 may be disposed on a same control substrate 410 and 420 as the light-blocking patterns 430. For example, in the display apparatus according to another embodiment of the present disclosure, the dummy pattern 450 of the mitigation area 403 may be in direct contact with the first control substrate 410, as shown in FIG. 11. The second control substrate 420 may be spaced apart from the light-blocking patterns 430 and the dummy pattern 450. The dummy pattern 450 may be formed simultaneously with the light-blocking patterns 430. Thus, in the display apparatus according to another embodiment of the present disclosure, a process of forming the light-blocking patterns 430 and the dummy pattern 450 may be simplified. Therefore, in the display apparatus according to another embodiment of the present disclosure, process efficiency may be improved.

Figure 12:
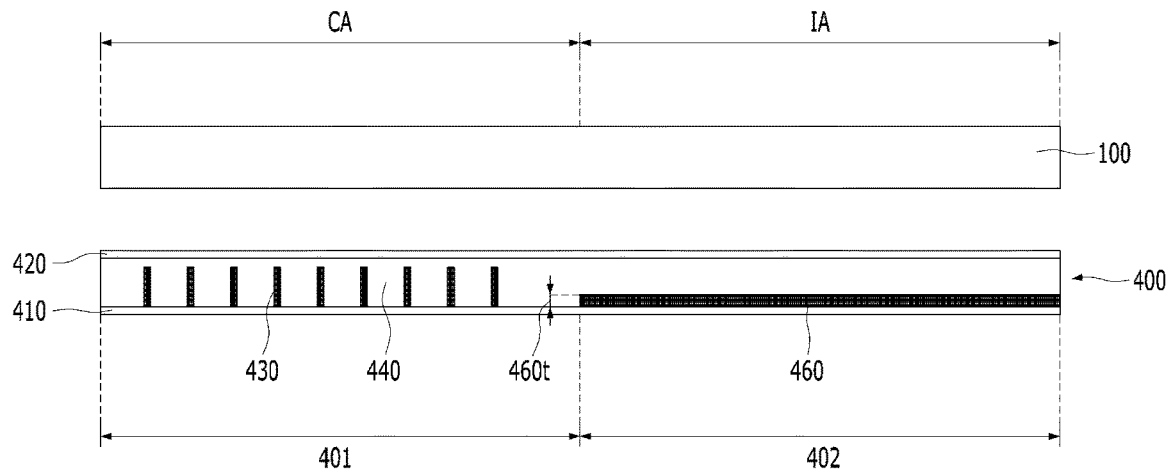

In the display apparatus according to another embodiment of the present disclosure, the dummy light-blocking layer 460 of the wide viewing angle area 402 may be disposed on a same control substrate 410 and 420 as the light-blocking patterns 430. For example, in the display apparatus according to another embodiment of the present disclosure, the wide viewing angle area 402 of the first control substrate 410 may be covered by the dummy light-blocking layer 460, as shown in FIG. 12. The dummy light-blocking layer 460 may be in direct contact with the first control substrate 410. For example, the dummy light-blocking layer 460 may be formed simultaneously with the light-blocking patterns 430. Thus, in the display apparatus according to another embodiment of the present disclosure, process efficiency may be improved.

Figure 13:
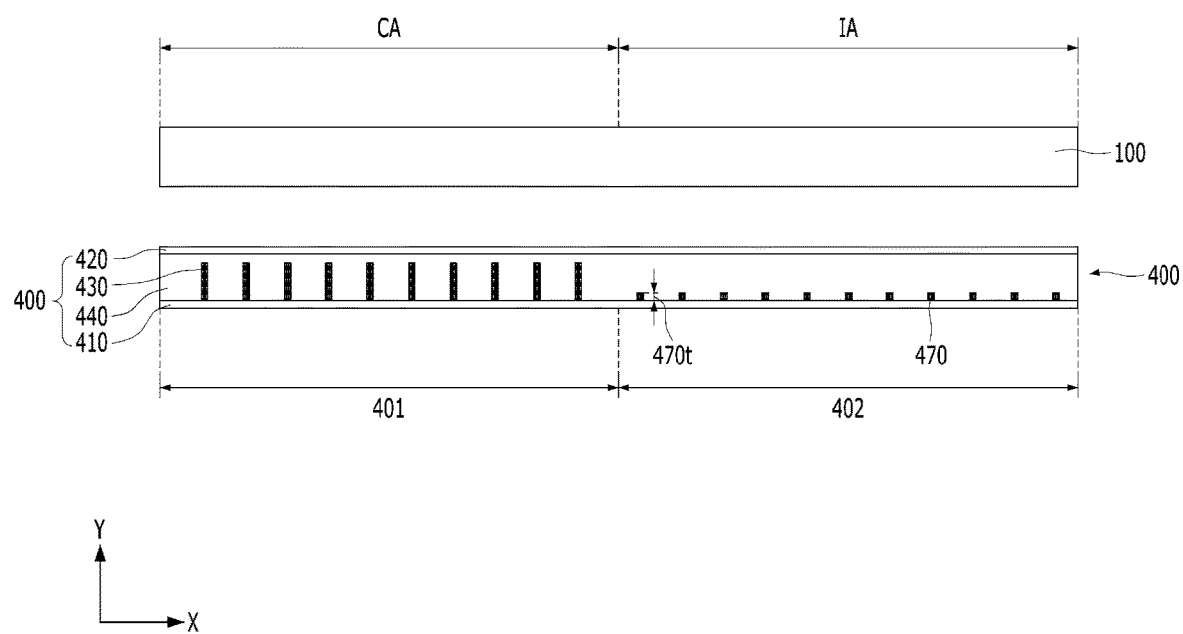

The display apparatus according to another embodiment of the present disclosure may include mitigating patterns 470 disposed in the wide viewing angle area 402 of the viewing angle control unit 400. For example, in the display apparatus according to another embodiment of the present disclosure, the mitigating patterns 470 may be disposed on the wide viewing angle area 402 of the first control substrate 410, as shown in FIG. 13. The mitigating patterns 470 may be arranged with arranged at regular intervals. For example, an interval of the mitigating patterns 470 may be the same as an interval of the light-blocking patterns 430. The mitigating patterns 470 may be in direct contact with the first control substrate 410. For example, the pattern insulating layer 440 may extend between each mitigating pattern 470 and the second control substrate 420. The mitigating patterns 470 may extend parallel to each other in a direction. The mitigating patterns 470 may extend in a same direction as the light-blocking pattern 430. For example, the mitigating patterns 470 may extend in the third direction.

The mitigating patterns 470 may include a material capable of blocking light. The mitigating patterns 470 may include a black dye, such as carbon black. Thus, in the display apparatus according to another embodiment of the present disclosure, luminance of the light passing through the wide viewing angle area 402 of the viewing angle control unit 400 may be reduced by the mitigating patterns 470. The mitigating patterns 470 may include a same material as the light-blocking pattern 430. For example, the mitigating patterns 470 may be formed simultaneously with the light-blocking patterns 430.

A thickness 470t of each mitigating pattern 470 may be significantly smaller than the thickness of each light-blocking pattern 430. Thus, in the display apparatus according to another embodiment of the present disclosure, the travelling path of the light passing through the wide viewing angle area 402 of the viewing angle control unit 400 may be not greatly restricted by the mitigating patterns 470. That is, in the according to another embodiment of the present disclosure, an image realized by the light passing through the mitigating patterns 470 may be recognized by people adjacent in the first direction X. Therefore, in the display apparatus according to another embodiment of the present disclosure, luminance deviation of the light passing through the narrow viewing angle area 401 and the light passing through the wide viewing angle area 402 may be mitigated, without restricting a viewing angle of the wide viewing angle area 402.

Figure 14:
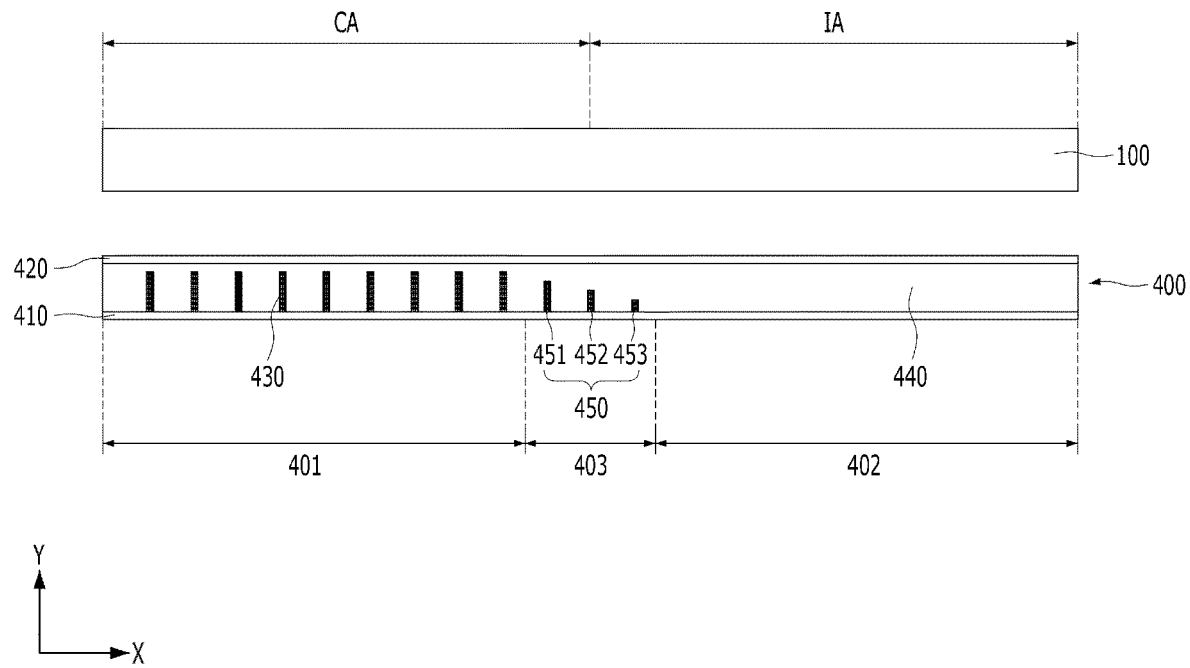

The display apparatus according to the embodiment of the present disclosure is described that the dummy pattern 450 of the mitigation area 403 has a same thickness. However, in the display apparatus according to another embodiment of the present disclosure, the dummy patterns 450 having different thicknesses may be disposed in the mitigation area 403, as shown in FIG. 14. For example, in the display apparatus according to another embodiment of the present disclosure, the dummy patterns 450 may include a first dummy pattern 451, a second dummy pattern 452 having a thickness smaller than the first dummy pattern 451, and a third dummy pattern 453 having a thickness smaller than the second dummy pattern 452. The first dummy pattern 451 may be disposed close to the narrow viewing angle area 401. The third dummy pattern 453 may be disposed close to the wide viewing angle area 402. The second dummy pattern 452 may be disposed between the first dummy pattern 451 and the third dummy pattern 453. For example, in the display apparatus according to another embodiment of the present disclosure, a thickness of the dummy patterns 450 may decrease from the narrow viewing angle area 401 to the wide viewing angle area 402. Thus, in the display apparatus according to another embodiment of the present disclosure, luminance deviation of the light passing through the narrow viewing angle area 401 and the light passing through the wide viewing angle area 402 may be effectively mitigated by the dummy patterns 450. Therefore, in the display apparatus according to another embodiment of the present disclosure, the boundary line between the first display area CA and the second display area IA may be not recognized by the user, when the first display area CA and the second display area IA of the liquid crystal panel 100 realize a single large image.

Figure 15:
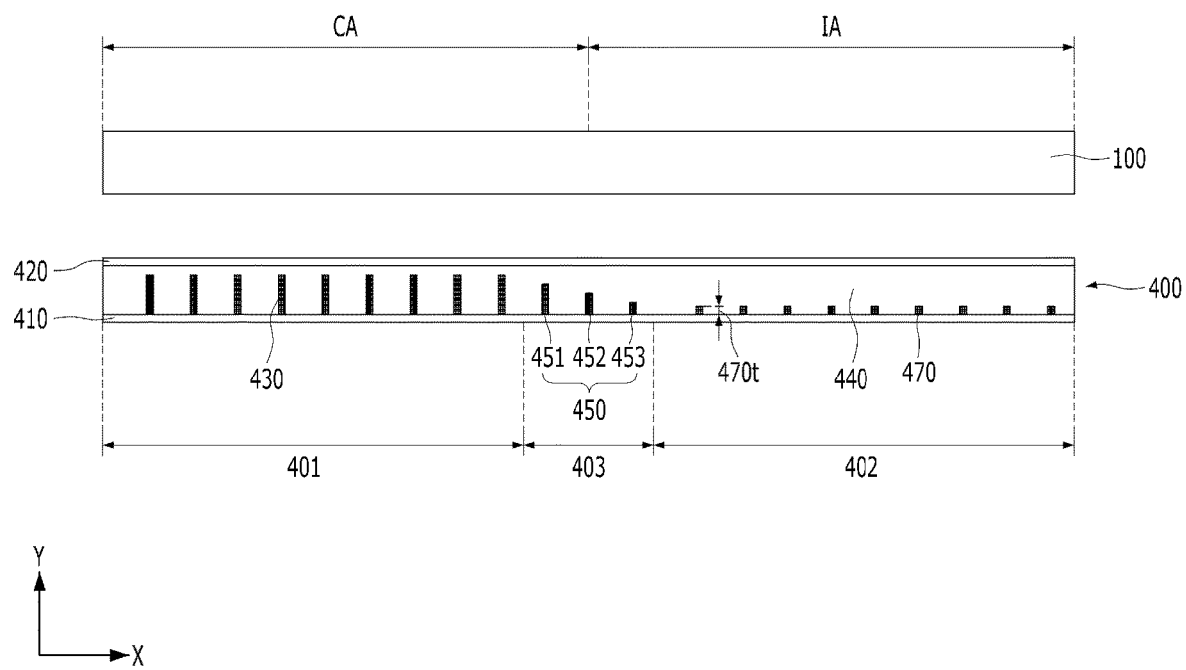

In the display apparatus according to another embodiment of the present disclosure, the dummy patterns 450 having different thickness may be disposed in the mitigation area 403, and the mitigating patterns 470 may be disposed in the wide viewing angle area 402, as shown in FIG. 15. A thickness 470t of each mitigating patterns 470 may be smaller than a thickness of the third dummy pattern 453. Thus, in the display apparatus according to another embodiment of the present disclosure, the boundary line between the first display area CA and the second display area IA may be barely recognized by the user.

Figure 16:
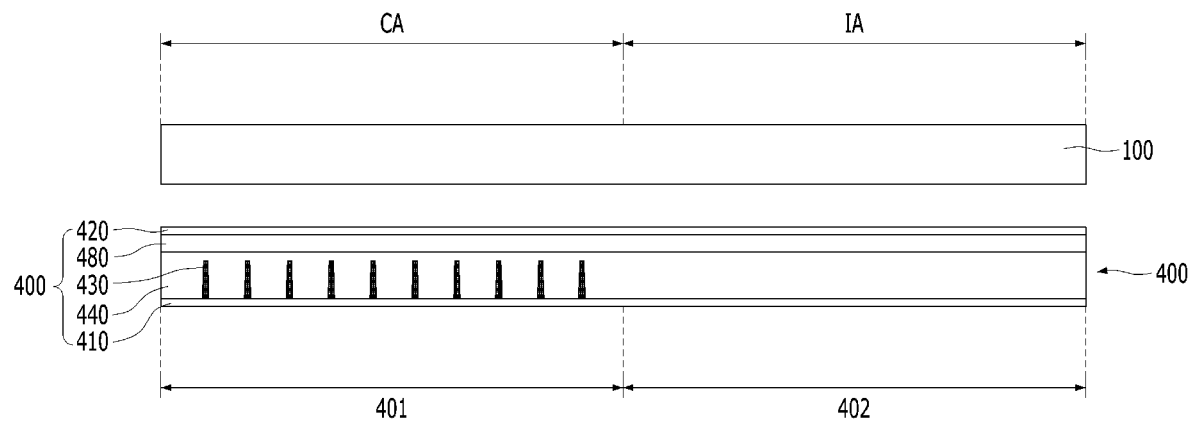

In the display apparatus according to another embodiment of the present disclosure, the light-blocking patterns 430 may be formed in various ways. For example, in the display apparatus according to another embodiment of the present disclosure, a process of forming the light-blocking patterns 430 may include a process of forming a plurality of trenches in the pattern insulating layer 440 and a process of filling the trenches with a material capable of blocking light. In the display apparatus according to another embodiment of the present disclosure, a base substrate 480 may be disposed between the pattern insulating layer 440 and the second control substrate 420, as shown in FIG. 16. The base substrate 480 may support the pattern insulating layer 440 in the process of forming the light-blocking patterns 430. For example, the base substrate 480 may have a thickness thicker than the first control substrate 410 and the second control substrate 420. A side of each light-blocking pattern 430 may be inclined. For example, a horizontal width of each light-blocking pattern 430 may be decrease from the first control substrate 410 toward the second control substrate 420. Thus, in the display apparatus according to another embodiment of the present disclosure, the degree of freedom for the forming process of the light-blocking patterns 430 may be improved.

Figure 17:
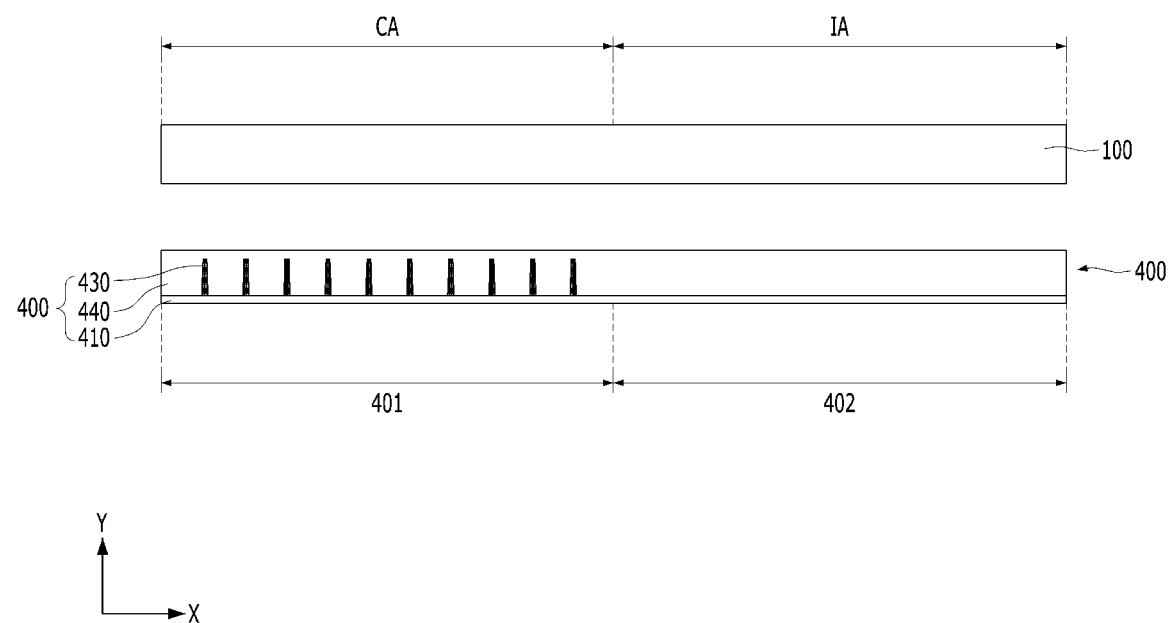

The display apparatus according to the embodiment of the present disclosure is described that the pattern insulating layer 440 is disposed between the first control substrate 410 and the second control substrate 420. However, in the display apparatus according to another embodiment of the present disclosure, at least one of a first surface of the pattern insulating layer 440 toward the light-guide plate and a second surface of the pattern insulating layer 440 toward the liquid crystal panel 100 may be not covered by the control substrate 410 and 420. For example, in the display apparatus according to another embodiment of the present disclosure, the viewing angle control unit 400 may be consist of the light-blocking patterns 430 on the narrow viewing angle area 401 of the first control substrate 410 and the pattern insulating layer 440 surrounding the light-blocking patterns 430, as shown in FIG. 17. A surface of the pattern insulating layer 440 toward the liquid crystal panel 100 may be exposed. Thus, in the display apparatus according to another embodiment of the present disclosure, the overall size may be reduced. And, in the display apparatus according to another embodiment of the present disclosure, decrease in luminance due to the second control substrate may be prevented. Therefore, in the display apparatus according to another embodiment of the present disclosure, the degree of freedom for the configuration of the viewing angle control unit 400 may be improved.

In the result, the display apparatus according to the embodiments of the present disclosure may comprise the viewing angle control unit disposed between the first light-guide plate and the second light-guide plate of the back-light unit, and the liquid crystal panel on the second light-guide plate of the back-light unit, wherein the liquid crystal panel may include the first display area and the second display area, the viewing angle control unit may include the light-blocking patterns overlapping with the first display area, and wherein the second display area may be disposed outside the light-blocking patterns. Thus, in the display apparatus according to the embodiments of the present disclosure, the first image realized in the first display area may be not recognized by surrounding people, selectively. Thereby, in the display apparatus according to the embodiments of the present disclosure, the accidents due to gaze dispersion of the surrounding people may be prevented.

What is claimed is:

1. A display apparatus, comprising:
   a first light-source element configured to provide light to a first optical plate;
   a second light-source element configured to provide light to a second optical plate, wherein the second light-source element is configured to be turned on or off depending on a narrow viewing mode or a wide viewing mode;
   a display panel on the second optical plate configured to receive light and generate an image, the display panel including a first display area and a second display area; and
   a viewing angle control unit between the first optical plate and the second optical plate, a first area of the viewing angle control unit overlapping the first display area of the display panel, a second area of the viewing angle control unit overlapping the second display area of the display panel, a third area of the viewing angle control unit overlapping with a boundary between the first display area and the second display area,
   wherein the viewing angle control unit includes at least one or more light-blocking patterns extending in a first direction in the first area, and at least one or more dummy patterns in the third area, and
   wherein a thickness of the one or more dummy patterns is smaller than a thickness of the one or more light-blocking patterns.

2. The display apparatus of claim 1, wherein:
   when the second light-source element is turned off during the narrow viewing mode, the first display area of the display panel configured to receive light from the first light-source element passing through spaces between the one or more light-blocking patterns to emit the image; and
   when the second light-source element is turned on during the wide viewing mode, the first display area of the display panel is configured to receive light from the first light-source element passing through the spaces and light from the second light-source element to emit the image.

3. The display apparatus of claim 1, wherein the one or more light-blocking patterns are formed of black dye or black color material.

4. The display apparatus of claim 1, wherein the viewing angle control unit includes a first control substrate and the one or more light-blocking patterns are attached to the first control substrate.

5. The display apparatus of claim 4, wherein the one or more dummy patterns are attached to the first control substrate.

6. The display apparatus of claim 1, wherein the one or more dummy patterns include a same material as the one or more light-blocking patterns.

7. The display apparatus of claim 1, wherein the one or more dummy patterns extend in the first direction.

8. The display apparatus of claim 1, wherein a thickness of the one or more dummy patterns becomes smaller in a second direction from the first area to a second area.

9. The display apparatus of claim 1, wherein the viewing angle control unit includes one or more mitigating patterns in the second area.

10. The display apparatus of claim 9, wherein a thickness of the one or more mitigating patterns is smaller than a thickness of the one or more light-blocking patterns.

11. The display apparatus of claim 9, wherein the one or more mitigating patterns include a same material as the one or more light-blocking patterns.

12. The display apparatus of claim 9, wherein an interval of the one or more mitigating patterns is the same as an interval of the one or more light-blocking patterns.

13. The display apparatus of claim 9, wherein the one or more mitigating patterns extend in the first direction.

14. The display apparatus of claim 1, wherein the display panel is a liquid crystal display panel.

15. The display apparatus of claim 1, wherein the first light-source element is disposed on a rear surface of the first optical plate, and the second light-source element is disposed on a side surface of the second optical plate.

16. The display apparatus of claim 1, wherein the first display area corresponds to a viewing area of a passenger seat of a vehicle and the second display area corresponds to a viewing area of a driver seat of the vehicle.

17. The display apparatus of claim 1, further comprising a second viewing control unit on the second optical plate, wherein the second viewing control includes at least one or more second light-blocking patterns extending in the first direction, wherein the one or more light-blocking patterns are arranged along a second direction and the one or more second light-blocking patterns are arranged along a third direction different than the second direction.

18. A display apparatus, comprising:
    a first light-source element configured to provide light to a first optical plate on the substrate;
    a second light-source element configured to provide light to a second optical plate, wherein the second light-source element is configured to be turned on or off depending on a narrow viewing mode or a wide viewing mode;
    a display panel on the second light-guide plate configured to receive light and generate an image, the display panel including a first display area and a second display area; and
    a viewing angle control unit between the first light-guide plate and the second light-guide plate, a first area of the viewing angle control unit overlapping the first display area of the display panel, a second area of the viewing angle control unit overlapping the second display area of the display panel, a third area of the viewing angle control unit overlapping with a boundary between the first display area and the second display area,
    wherein the first area of the viewing angle control unit blocks at least a portion of light from the first light-source element emitted in a direction different from the first direction from reaching the first display area of the display panel, and
    wherein the third area of the viewing angle control unit blocks at least a smaller portion of light from the first light-source element emitted in the direction different from the first direction than the portion of light blocked by the first area of the viewing angle control unit.

19. The display apparatus of claim 18, wherein the second area of the viewing angle control unit blocks at least a smaller portion of light from the first light-source element emitted in the direction different from the first direction than the portion of light blocked by the first area of the viewing angle control unit.

* * * * *